(12) United States Patent
Wang et al.

(10) Patent No.: US 9,876,381 B2
(45) Date of Patent: Jan. 23, 2018

(54) BIDIRECTIONAL WIRELESS CHARGING DEVICE AND BIDIRECTIONAL WIRELESS CHARGING SYSTEM

(71) Applicant: ANPEC ELECTRONICS CORPORATION, Hsinchu (TW)

(72) Inventors: Yuan-Hung Wang, Miaoli County (TW); Che-Chang Chang, Hsinchu County (TW); Chieh-Wen Cheng, Hsinchu (TW); Yung-Ning Yang, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 179 days.

(21) Appl. No.: 14/672,373

(22) Filed: Mar. 30, 2015

(65) Prior Publication Data

US 2016/0211694 A1 Jul. 21, 2016

(30) Foreign Application Priority Data

Jan. 19, 2015 (TW) .............................. 104101681 A

(51) Int. Cl.
*H01M 10/46* (2006.01)
*H02J 7/02* (2016.01)
*H02J 50/00* (2016.01)

(52) U.S. Cl.
CPC .............. *H02J 7/025* (2013.01); *H02J 50/00* (2016.02)

(58) Field of Classification Search
CPC .................................. H02J 7/025; H02J 5/005
USPC ........................ 320/107, 108; 307/104, 108
See application file for complete search history.

(56) References Cited

U.S. PATENT DOCUMENTS

| 6,215,360 | B1* | 4/2001 | Callaway, Jr. | .......... | H03F 3/607 |
| | | | | | 455/73 |
| 2010/0148723 | A1* | 6/2010 | Cook | ................... | G06K 7/0008 |
| | | | | | 307/104 |
| 2011/0254377 | A1* | 10/2011 | Wildmer | ............... | B60L 11/182 |
| | | | | | 307/104 |
| 2015/0244176 | A1* | 8/2015 | Van Den Brink | ...... | H02J 5/005 |
| | | | | | 307/104 |
| 2015/0311723 | A1* | 10/2015 | Raedy | ................... | H02M 3/337 |
| | | | | | 307/104 |

FOREIGN PATENT DOCUMENTS

TW          201411980 A      3/2014

* cited by examiner

*Primary Examiner* — Edward Tso
(74) *Attorney, Agent, or Firm* — Li & Cai Intellectual Property (USA) Office

(57) ABSTRACT

The present disclosure illustrates a bidirectional wireless charging device. The bidirectional wireless charging device comprises a transceiver chip which is configured to receive a switch signal. The transceiver chip comprises a power stage circuit and a control module. The power stage circuit is coupled to a coil, and the control module is coupled to the power stage circuit. The power stage circuit is configured to output a voltage to the coil, or to receive an induced voltage from the coil. The control module is configured to control the transceiver chip to enter a power mode or a charging mode based upon the switch signal. When the transceiver chip enters the power mode, the transceiver chip provides the voltage to the coil. When the transceiver chip enters the charging mode, the transceiver chip receives the induced voltage from the coil and charges a power storage unit.

22 Claims, 7 Drawing Sheets

BIDIRECTIONAL WIRELESS CHARGING DEVICE AND BIDIRECTIONAL WIRELESS CHARGING SYSTEM

BACKGROUND OF THE INVENTION

1. Field of the Invention

The instant disclosure relates to a bidirectional wireless charging device; in particular, to a bidirectional wireless charging device with an integrated transceiver chip.

2. Description of Related Art

With the technology well developed, there are many kinds of personal mobile devices and wearable devices which connect with the Internet, provide people a so-called mobile life, and thus increase the convenience in our daily lives. However, the requirement of electric power for using these electric products also gradually increases. For solving this problem, there is a wireless charging device developed currently. The wireless charging device can be generally categorized as two kinds, wherein one is the wireless charging device using the Electromagnetic Induction Technology and another is the wireless charging device using the Electromagnetic Resonance Technology. Particularly, the wireless charging device using the Electromagnetic Induction Technology is more common. The advantage of the wireless charging device is that the electric device and the wireless charging device do not need wires to have a connection.

In the prior art, one wireless charging device merely has a signal direction wireless charging function. For example, the wireless charging device as a powering end can merely provide electric power, and the wireless charging device as a charging end can merely receive electric power. Generally, there is not the wireless charging device which can provide electric power outdoors, which means that the user's portable electric device may not be used anywhere anytime. For example, when the power of the wireless charging device runs out and the wearable device, such as a smart watch, has an urgent request for charging, if there was an electric device having sufficient power which could charge the smart watch, the above problem could be solved.

Therefore, in the prior art, there has been a kind of bidirectional wireless charging device developed. The bidirectional wireless charging device has a power providing function and a power receiving function. Thus, the bidirectional wireless charging device can be a powering end or a charging end under different circumstances.

However, the traditional bidirectional wireless charging device must have an emitter chip and its corresponding circuit (such as a control circuit, a modulation circuit, a power stage circuit and the like), and have a transceiver chip and its corresponding circuit (such as a control circuit, a modulation circuit, a power stage circuit, a rectifying circuit and the like). In other words, to realize the bidirectional wireless charging function, the area of inner circuit of the bidirectional wireless charging and the cost dramatically increase.

SUMMARY OF THE INVENTION

The instant disclosure provides a bidirectional wireless charging device. The bidirectional wireless charging device comprises a transceiver chip receiving a switch signal. The transceiver chip comprises a power stage circuit and a control module. The power stage circuit is electrically connected to a coil, and outputs a voltage to the coil or receives an induced voltage from the coil. The control module is electrically connected to the power stage circuit, and correspondingly makes the transceiver chip turn into a power mode or a charging mode according to the switch signal. The transceiver chip provides the voltage to the coil when the switch signal indicates that the transceiver chip turns into the power mode. The transceiver chip receives the induced voltage from the coil and charges a power storage unit of the bidirectional wireless charging device, when the switch signal indicates that the transceiver chip turns into the charging mode.

The instant disclosure further provides a bidirectional wireless charging system. The bidirectional wireless charging system comprises at least two bidirectional wireless charging devices. Each bidirectional wireless charging device comprises a transceiver chip receiving a switch signal. The transceiver chip comprises a first bidirectional wireless charging device and a second bidirectional wireless charging device. The first bidirectional wireless charging device and the second bidirectional wireless charging device respectively comprise a power stage circuit and a control module. The power stage circuit is electrically connected to a coil, and outputs a voltage to the coil or receives an induced voltage from the coil. The control module is electrically connected to the power stage circuit, and correspondingly makes the transceiver chip turn into a power mode or a charging mode according to the switch signal. The first bidirectional wireless charging device and the second bidirectional wireless charging device are either a charging end and a powering end according to the switch signal. When the first bidirectional wireless charging device is the powering end, the transceiver chip of the first bidirectional wireless charging device turns into the power mode and provides the voltage to the coil so as to make the first bidirectional wireless charging device provide a pulse width modulated signal to the second bidirectional wireless charging device. The pulse width modulated signal includes an electromagnetic energy. When the second bidirectional wireless charging device is the charging end, the transceiver chip of the second bidirectional wireless charging device turns into the charging mode, receives the induced voltage from the coil, and charges a power storage unit of the second bidirectional wireless charging device.

To sum up, the bidirectional wireless charging device provided by the instant disclosure can used as a powering end or a charging end to improve the convenience of the bidirectional wireless charging device. Moreover, compared with the traditional bidirectional wireless charging device, the transceiver chip of the bidirectional wireless charging device provided by the instant disclosure integrates the power mode operation module and the charging mode operation module into a single chip. Thereby, merely one control module and one power stage circuit are needed for the instant disclosure to provide the bidirectional wireless charging function, which effectively shrinks the circuit area, decreases the cost and also reduces the system complexity.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Figure 1:
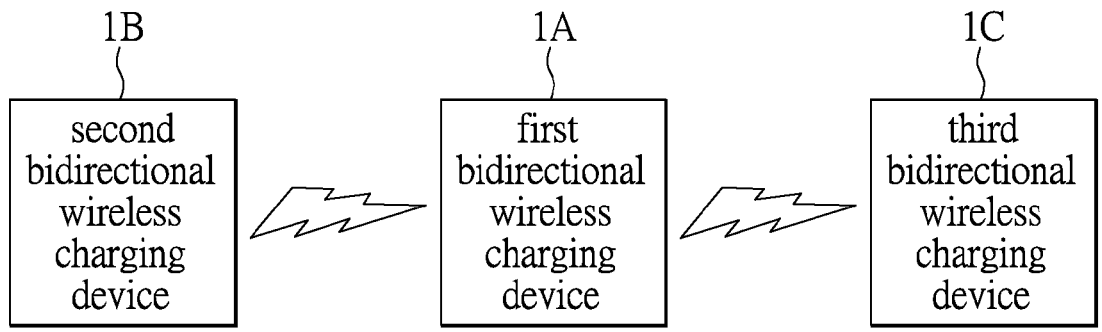
FIG. 1 shows a schematic diagram of a bidirectional wireless charging system of one embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the instant disclosure. As used herein, the term "and/or" includes any and all combinations of one or more of the associated listed items.

Please refer to FIG. 1, FIG. 1 shows a schematic diagram of a bidirectional wireless charging system of one embodiment of the instant disclosure. The bidirectional wireless charging system comprises at least two bidirectional wireless charging devices. In this embodiment, the bidirectional wireless charging system comprises a first bidirectional wireless charging device 1A, a second bidirectional wireless charging device 1B and a third bidirectional wireless charging device 1C. It is to be noted that FIG. 1 is merely used to describe the bidirectional wireless charging system of one embodiment of the instant disclosure but does not limit the instant disclosure. In other embodiments, the bidirectional wireless charging system can merely comprise two bidirectional wireless charging devices or comprise more than two bidirectional wireless charging devices.

The first bidirectional wireless charging device 1A, the second bidirectional wireless charging device 1B and the third bidirectional wireless charging device 1C can be a mobile phone, a tablet computer, a laptop, a wireless charger, a smart watch, a set-top box or other electric products having a wireless charging function. For an easy instruction and understanding of the instant disclosure, in the following description, the first bidirectional wireless charging device 1A may be a mobile phone, the second bidirectional wireless charging device 1B may be a wireless charger and the third bidirectional wireless charging device 1C may be a smart watch. In addition, the first bidirectional wireless charging device 1A, the second bidirectional wireless charging device 1B and the third bidirectional wireless charging device 1C are operated according to the Electromagnetic Induction Technology. However, it is not limited herein. The first bidirectional wireless charging device 1A, the second bidirectional wireless charging device 1B and the third bidirectional wireless charging device 1C can also be operated according to the Electromagnetic Resonance Technology.

The second bidirectional wireless charging device 1B may often be provided with commercial power and thus maintain sufficient power. When the first bidirectional wireless charging device 1A has insufficient power, the user can operate the first bidirectional wireless charging device 1A to send a switch signal to the second bidirectional wireless charging device 1B. For example, the switch signal is an analogue signal indicating that the bidirectional wireless charging device turns into a power mode or a charging mode. For instance, the bidirectional wireless charging device receiving a high-level switch signal would turn into the power mode, and he bidirectional wireless charging device receiving a low-level switch signal would turn into the charging mode. After receiving the high-level switch signal, the second bidirectional wireless charging device 1B turns into the power mode and starts to charge the first bidirectional wireless charging device 1A.

In another case, when the stored power of the first bidirectional wireless charging device 1A is insufficient to drive the first bidirectional wireless charging device 1A, the user can also operate the second bidirectional wireless charging device 1B to send a low-level switch signal to the first bidirectional wireless charging device 1A. The switch signal has energy, so the first bidirectional wireless charging device 1A can be turned on by the energy of the switch signal. After that, the first bidirectional wireless charging device 1A would reply the second bidirectional wireless charging device 1B with a high-level switch signal. After receiving the high-level switch signal, the second bidirectional wireless charging device 1B starts to charge the first bidirectional wireless charging device 1A.

When the stored power of the first bidirectional wireless charging device 1A reaches a predetermined value (such as 90% of the maximum stored power of the first bidirectional wireless charging device 1A), the first bidirectional wireless charging device 1A sends a status signal to the second bidirectional wireless charging device 1B, so that the second bidirectional wireless charging device 1B ends the power mode and thus stops charging the first bidirectional wireless charging device 1A.

Sometimes the user may bring the first bidirectional wireless charging device 1A, the second bidirectional wireless charging device 1B and the third bidirectional wireless charging device 1C outside, and in this case the second bidirectional wireless charging device 1B can't be provided with commercial power and can't maintain sufficient power. When the second bidirectional wireless charging device 1B has insufficient power, the second bidirectional wireless charging device 1B can't charge the third bidirectional wireless charging device 1C. There may be a more urgent demand for using the third bidirectional wireless charging device 1C, so the user would try not to run out the power of the third bidirectional wireless charging device 1C. At this moment, the user can operate the third bidirectional wireless charging device 1C to send a switch signal to the first bidirectional wireless charging device 1A, so that the first bidirectional wireless charging device 1A would turn into the power mode and start to charge the third bidirectional wireless charging device 1C.

In other words, the first bidirectional wireless charging device 1A, the second bidirectional wireless charging device 1B and the third bidirectional wireless charging device 1C provided in this embodiment can be used as a charging end or a powering end, so as to increase the convenience of the bidirectional wireless charging system.

In addition, the switch signal can be a Pulse Width Modulation signal (PWM signal) sent by a coil; however, it is not limited herein. For example, in other embodiments, the bidirectional wireless charging device 1 can send a switch signal wirelessly via a wireless transmission unit (not shown in FIG. 1).

Figure 2:
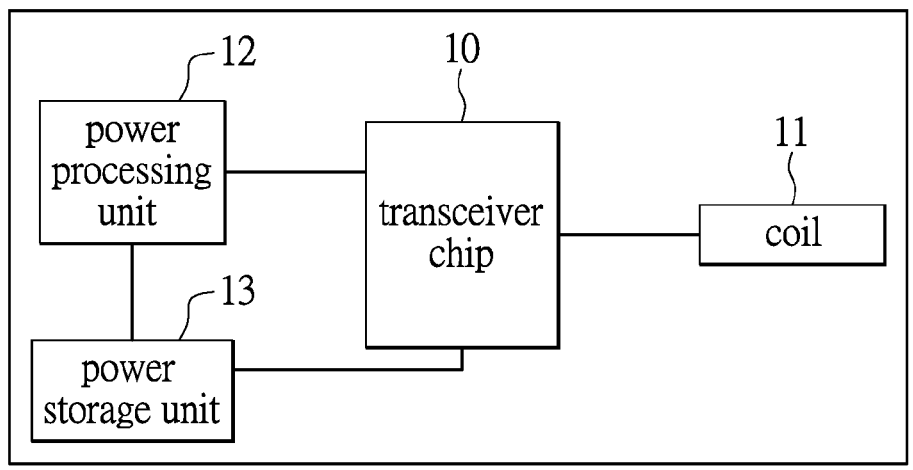
FIG. 2 shows a block diagram of a bidirectional wireless charging device of one embodiment of the instant disclosure.

There is further instruction for a structure of the bidirectional wireless charging device in the following description. Please refer to FIG. 2, FIG. 2 shows a block diagram of a bidirectional wireless charging device of one embodiment of the instant disclosure. The bidirectional wireless charging device 1 can be one of the above mentioned first bidirectional wireless charging device, second bidirectional wireless charging device 1B and third bidirectional wireless charging device 1C. For a need to instruct easily, they are described as the bidirectional wireless charging device 1 in the following description.

The bidirectional wireless charging device 1 comprises a transceiver chip 10, a coil 11, a power processing unit 12 and a power storage unit 13. The coil 11 is electrically connected to the transceiver chip 10. The transceiver chip is electrically connected to the power processing unit 12 and the power storage unit 13. The power processing unit 12 is electrically connected to the power storage unit 13.

The coil 11 can be a cable coil or other inductor that can generate an induced voltage corresponding to a variable electromagnetic field. When the bidirectional wireless charging device 1 is used as a powering end, the coil 11 can convert the voltage into a PWM signal and send the PWM signal out. The PWM signal includes an electromagnetic energy, so a charging end can charge with the received electromagnetic energy. When the bidirectional wireless charging device is used as a charging end, the coil 11 can sense the PWM signal and convert the electromagnetic energy of the PWM signal into an induced voltage.

The transceiver chip 10 receives the switch signal and correspondingly controls and makes the bidirectional wireless charging device 1 turn into the power mode or the charging mode. Moreover, when the bidirectional wireless charging device 1 is used as a powering end, the transceiver chip 10 receives the voltage from the power processing unit 12 and the power storage unit 13, and provides the voltage to the coil 11 so that the coil 11 generates a PWM signal. When the bidirectional wireless charging device 1 is used as a charging end, the transceiver chip 10 receives an induced voltage generated by the coil 11, and rectifies and regulates the induced voltage to generate a regulated voltage.

The power processing unit 12 manages the stored power of the bidirectional wireless charging device 1. For example, the power processing unit 12 determines when to transmit the regulated voltage outputted by the transceiver chip 10 to the power storage unit 13, or makes the power storage unit 13 provide power to the transceiver chip 11.

The power storage unit 13 is used to store power, for example, the battery of the bidirectional wireless charging device 1 or other power storage devices, such as a capacitor.

Figure 3A:
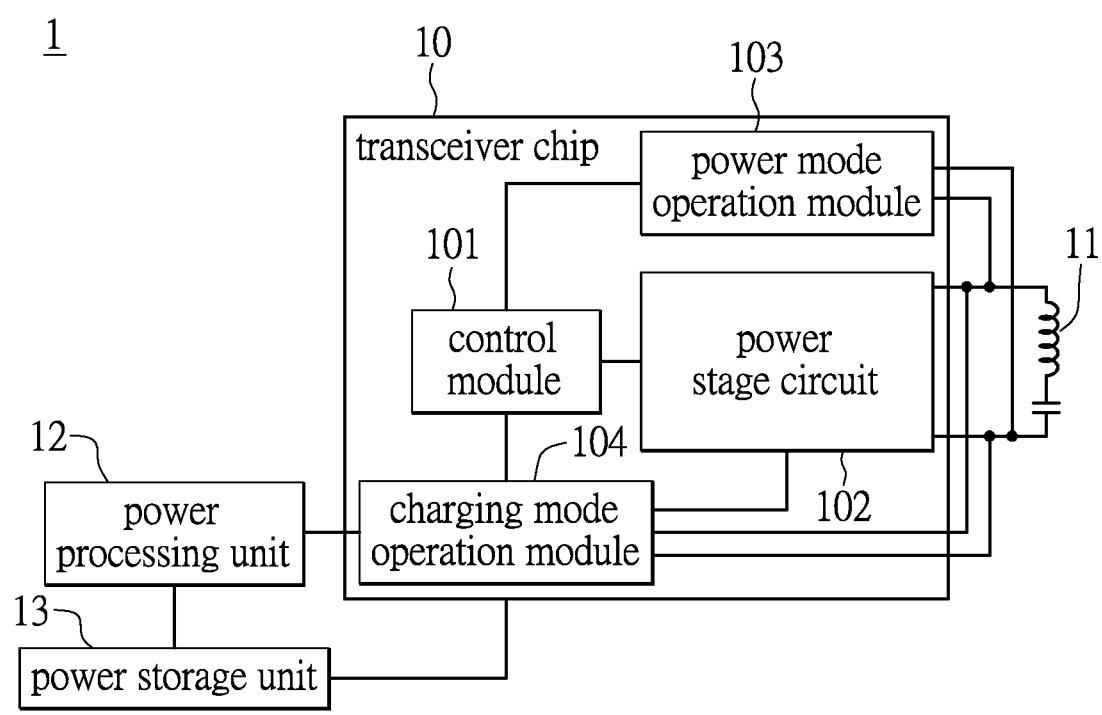
FIG. 3A a schematic diagram of a bidirectional wireless charging device of one embodiment of the instant disclosure.

For further instruction, please refer to FIG. 3A. FIG. 3A is a schematic diagram of a bidirectional wireless charging device of one embodiment of the instant disclosure. As described in the above embodiment, the bidirectional wireless charging device 1 comprises a transceiver chip 10, a coil 11, a power processing unit 12 and a power storage unit 13. The relationship of connection between the transceiver chip 10, the coil 11, the power processing unit 12 and the power storage unit 13 for this embodiment can be referred to the description in the previous embodiment, and thus the redundant information is not repeated. The following description is merely for the difference between this embodiment and the previous embodiment.

The transceiver chip 10 further comprises a control module 101, a power stage circuit 102, a charging mode operation module 104 and a power mode operation module 103. The control module 101 is electrically connected to the power stage circuit 102. The power stage circuit 102 is electrically connected to the coil 11. The charging mode operation module 104 is electrically connected to the control module 101 and the coil 11. The power mode operation module 103 is electrically connected to the control module 101 and the coil 11.

Figure 3B:
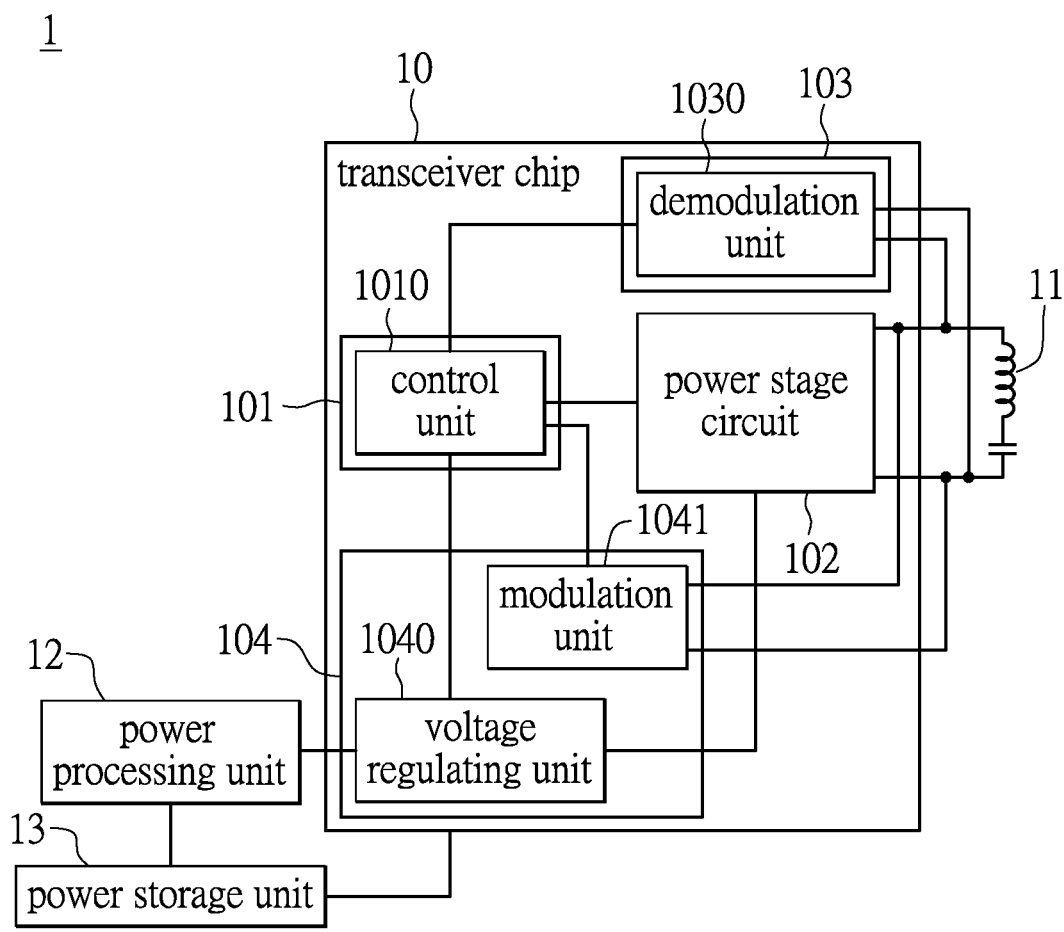
FIG. 3B a schematic diagram of a bidirectional wireless charging device of another embodiment of the instant disclosure.

In conjunction with FIG. 3a and FIG. 3B, FIG. 3B is a schematic diagram of a bidirectional wireless charging device of another embodiment of the instant disclosure. The transceiver chip 10 of the bidirectional wireless charging device 1 also comprises a control module 101, a power stage circuit 102, a charging mode operation module 104 and a power mode operation module 103. The following is further instruction about the structure and function of the transceiver chip 10.

The control module 101 comprises a control unit 1010. The control unit 1010 is electrically connected to the power stage circuit 102. The control unit 1010 controls and adjusts the voltage output by the power stage circuit 102.

The power stage circuit 102 comprises a power switch, a pulse width modulation circuit, an isolated high-frequency transformer, a rectifying circuit and an output filter (not shown in FIG. 3B). The rectifying circuit can be, for example, a half-bridge rectifying circuit or a full-bridge rectifying circuit, to generate a rectified voltage.

When the bidirectional wireless charging device 1 is used as a power end, the power stage circuit 102 drives the power switch and provides a voltage to the coil 11, so that the coil 11 is driven to have a resonance and output a PWM signal. When the bidirectional wireless charging device 1 is used as a charging end, the power stage circuit 102 receives an induced voltage from the coil 11 and generates a rectified voltage. The detailed structure and the working mechanism of the power stage circuit 102 would be able to be comprehended by one skilled in the art and further descriptions are therefore omitted.

The power mode operation module 103 comprises a demodulation unit 1030 electrically connected to the control unit 1010 and the coil 11. The demodulation unit 1030 receives a PWM signal PWM' output by another bidirectional wireless charging device which is used as a charging end via the coil 11, and demodulates the received PWM signal PWM'. The PWM signal PWM' includes a status message sent from the charging end. In detail, the status message comprises a quantity of the charging end (for example, the currently stored electric quantity of the charging end), an energy adjusting request, an energy maintaining request, a cut-off supply request or the like. The demodulation unit 1030 filters the high-frequency band out from PWM signal PWM', maintains the amplitude, and uses the amplitude size as a status message sent by the charging end. After that, the demodulation unit 1030 outputs the demodulated status message to the control unit 1010, so that the control unit 1010 correspondingly controls the voltage output by the power stage circuit 102 according to the demodulated status message.

For example, when the status message includes an energy adjusting request, the control unit 1010 would correspondingly adjust the voltage output by the power stage circuit 102 according to the currently stored power of the charging end. When the status message includes an energy maintaining request, the control unit 1010 would make the power stage circuit 102 maintain the provided voltage.

The charging mode operation module 104 comprises a voltage regulating unit 1040 and a modulation unit 1041. The voltage regulating unit 1040 is electrically connected to the control unit 1010, the power stage circuit 102 and the power processing unit 12. The modulation unit 1041 is electrically connected to the control unit 1010 and the coil 11. The voltage regulating unit 1040 receives the rectified voltage output by the power stage circuit 102, regulates the rectified voltage and outputs the regulated voltage to charge the power storage unit 13 of the bidirectional wireless charging device 1. The modulation unit 1041 is controlled by the control unit 1010. The control unit 1010 controls and makes the modulation unit 1041 generate a PWM signal including a status message according to the regulated voltage value and the power currently stored in the bidirectional wireless charging device.

Figure 4:
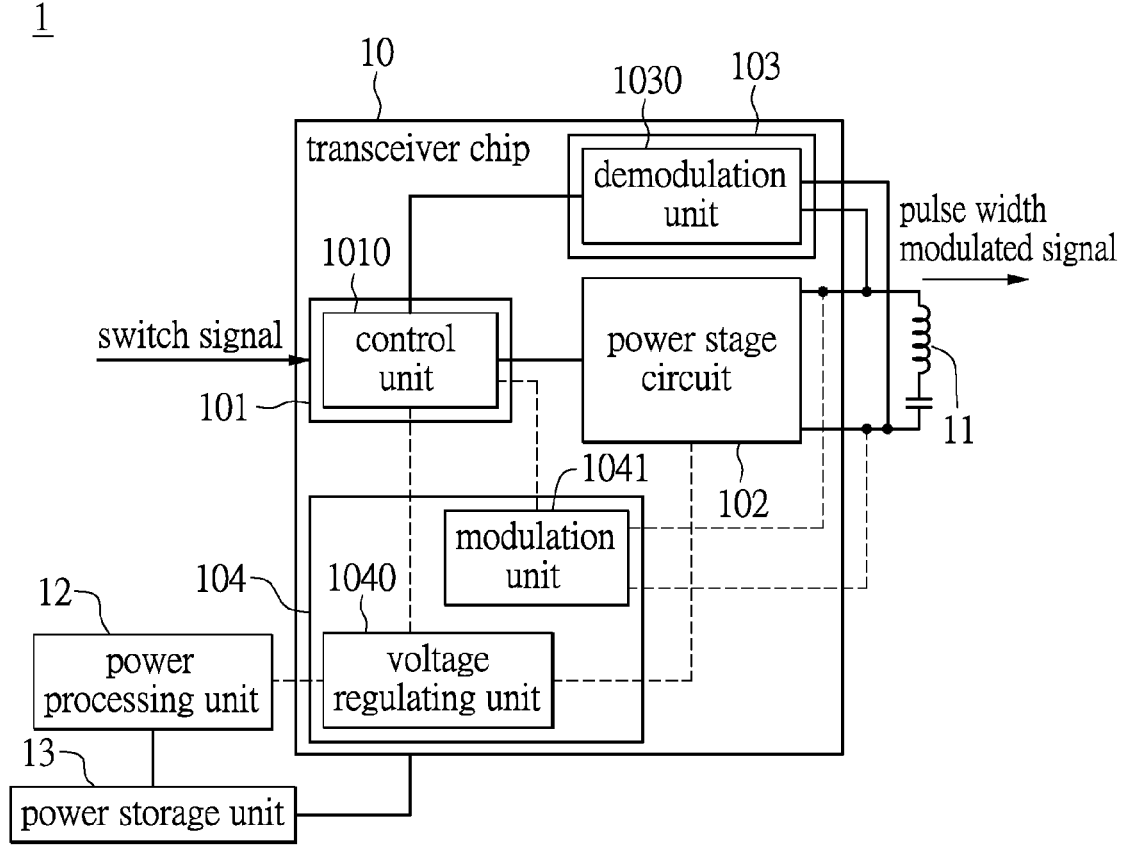
FIG. 4 shows a schematic diagram of a bidirectional wireless charging device of one embodiment of the instant disclosure in the power mode.

Please refer to FIG. 4. FIG. 4 shows a schematic diagram of a bidirectional wireless charging device of one embodiment of the instant disclosure in the power mode. When another bidirectional wireless charging device 1' (not shown in FIG. 4, such as the wireless charging device 1' in FIG. 5) has insufficient power (for example, the left power of the bidirectional wireless charging device 1' is less than 20% of the maximum stored power but more than the minimum stored power), the user can operate the bidirectional wireless charging device 1' to send a switch signal, such as a high-level switch signal. After receiving the switch signal, the bidirectional wireless charging device 1 turns into the power mode and becomes a powering end to start to provide power to the bidirectional wireless charging device V. In addition, in this embodiment, the high-level switch signal corresponds to the power mode but it is not limited herein. That is, in other embodiments, the low-level switch signal can also be set to correspond to the power mode.

Further, when the switching unit (not shown in FIG. 4) of the control module 101 receives the high-level switch signal, the switching unit makes the circuit path corresponding to the power mode operation module 103 turn on (shown as the circuit path connected by the real line in FIG. 4), and makes the circuit path corresponding to the charging mode operation module 103 turn off (shown as the circuit path connected by the dash line in FIG. 4.). The switching unit may be, for example, a multiplexer or a Metal-Oxide-Semiconductor Field-Effect Transistor (MOSFET) switch, so as to switch the corresponding circuit path according to the switch signal.

After the bidirectional wireless charging device 1 turns into the power mode, the power processing unit 12 controls the power storage unit 13 to provide power to the power stage circuit 102. After that, the control unit 1010 of the control module 101 controls the power stage circuit 102 to output a voltage to the coil 11 so as to drive the coil to have the resonance and to output a PWM signal having the electromagnetic energy. As the charging end, the coil 11 of the bidirectional wireless charging device 1' generates an induced voltage via the electromagnetic induction and start to charge.

When the stored power of the bidirectional wireless charging device 1' reaches a predetermined value, the bidirectional wireless charging device 1' would output a PWM signal including a cut-off supply request. After the demodulation unit 1030 of the power mode operation module 103 of the bidirectional wireless charging device 1 receives a PWM signal PWM' via the coil 11, it would demodulate the PWM signal PWM' and output a demodulated status message. The control unit 1010 receives the status message and correspondingly controls the output power of the power stage circuit 102 according to the status message. For example, when the bidirectional wireless charging device 1 receives the status message indicating that the stored power of the bidirectional wireless charging device 1' reaches a predetermined value (such as 90% of the maximum stored power of the bidirectional wireless charging device 1', but it is not limited herein), the control unit 1010 of the bidirectional wireless charging device 1 makes the power stage circuit 102 stop charging the bidirectional wireless charging device 1'.

Figure 5:
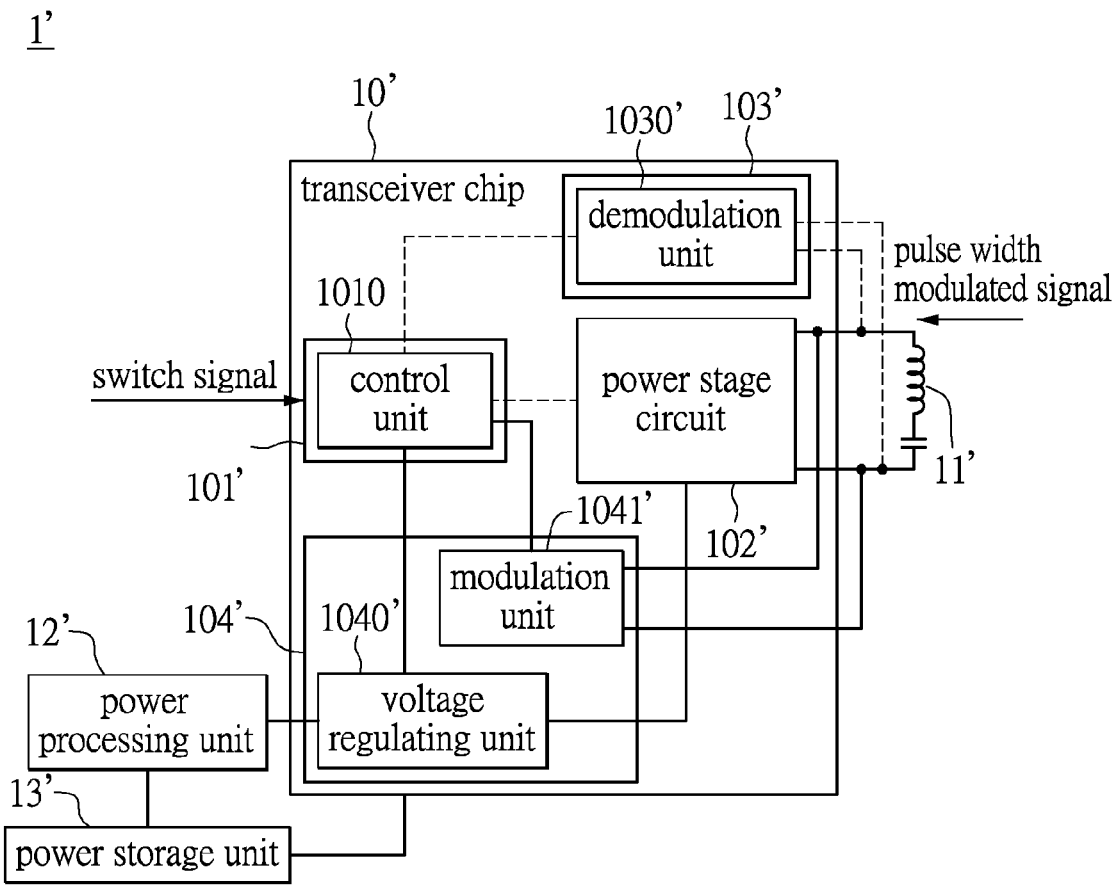
FIG. 5 shows a schematic diagram of a bidirectional wireless charging device of one embodiment of the instant disclosure in the charging mode.

Please refer to FIG. 5. FIG. 5 shows a schematic diagram of a bidirectional wireless charging device of one embodiment of the instant disclosure in the charging mode. Different from the embodiment shown in FIG. 4, the bidirectional wireless charging device 1' shown in FIG. 5 is used as the charging end. In addition, the bidirectional wireless charging device 1 shown in FIG. 4 and the bidirectional wireless charging device 1' shown in FIG. 5 have the same structure but different operation modes.

Further, when the user tends to charge the bidirectional wireless charging device 1', the user can make the bidirectional wireless charging device 1' turn into the charging mode. At this moment, the switching signal generating unit (not shown in FIG. 5) of the bidirectional wireless charging device 1' would generate a high-level switch signal and a low-level switch signal. The high-level switch signal is sent to the bidirectional wireless charging device 1 (not shown in FIG. 5, such as the wireless charging device 1), so that the bidirectional wireless charging device 1 turns into the power mode. The low-level switch signal is sent to the control module 101' of the bidirectional wireless charging device 1', so that the bidirectional wireless charging device 1' turns into the power mode.

After the switching unit (not shown in FIG. 5) of the control module 101' receives the switch signal, the switching unit makes the circuit corresponding to the charging mode operation module 104' turn on (shown as the circuit path connected by the real line in FIG. 5), but makes the circuit corresponding to the powering mode operation module 103' turn off (shown as the circuit path connected by the dotted line in FIG. 5). As mentioned above, the switching unit, such as a multiplexer or a MOSFET switch, is configured to correspondingly switch the circuit paths according to the switch signal.

The coil 11' receives the PWM signal from the bidirectional wireless charging device 1, and converts the electromagnetic energy of the PWM signal into an induced voltage. The power stage circuit receives and rectifies the induced voltage, and outputs a rectified voltage.

The voltage regulating unit 1040' of the charging mode operation module 104' receives and regulates the rectified voltage, and generates a regulated voltage. After that, the voltage regulating unit 1040' outputs the regulated voltage to the control unit 1010', so as to provide power for the operation of the bidirectional wireless charging device V. Moreover, the voltage regulating unit 1040' outputs the regulated voltage to the power processing unit 12', and the power processing unit 12' uses the regulated voltage to charge the power storage unit 13'.

After receiving the regulated voltage, the control unit 1010' makes the modulation unit 1041' change the voltage amplitude of the coil 11 according to the regulated voltage value and the currently stored power of the bidirectional wireless charging device 1', so that the coil 11' generates a PWM signal PWM' including a status message for informing the powering end about the current electric quantity of the bidirectional wireless charging device 1', an energy adjusting request, an energy maintaining request or a cut-off supply request.

The steps for the bidirectional wireless charging device 1' to generate a PWM signal PWM' are as follows. After receiving the regulated voltage, the control unit 1010' determines whether the power provided from the power storage unit 13' to the bidirectional wireless charging device 1' is within a normal range. If the power provided by the power storage unit 13' is not within the normal range, it means that the power currently stored in the power storage unit is insufficient to support and maintain the operation of the bidirectional wireless charging device V. At this moment, the control unit 1010' makes the modulation unit 1041' change the voltage amplitude of the coil 11', so as to generate a PWM signal PWM' including an energy adjusting request or an energy maintaining request. If the power provided by the power storage unit 13' is within the normal range, the control unit 1010' further detects whether the power stored in the power storage unit 13' reaches a predetermined value. When the control unit 1010' determines that the power stored in the power storage unit 13' reaches the predetermined value, the control unit 1010' makes the modulation unit 1041' generate a PWM signal PWM' including a cut-off supply signal.

For example, when the power provided by the power storage unit 13' is not within the normal range, the control unit 1010' makes the modulation unit 1041' generate a PWM signal PWM' including an energy adjusting request, so as to request the powering end to provide a PWM signal PWM having more energy.

When the power provided by the power storage unit 13' is within the normal range and the power stored in the power storage unit 13' has not reached the predetermined value (such as 90% of the maximum stored power of the bidirectional wireless charging device 1'), the control unit 1010' makes the modulation unit 1041' generate a PWM signal PWM' including an energy adjusting request, so as to request the powering end to output a PWM signal PWM having more energy. In another case, the control unit 1010' can also makes the modulation unit 1041' generate a PWM signal PWM' including an energy maintaining request, so as to make the powering end keep outputting the current PWM signal PWM.

When the power provided by the power storage unit 13' is within the normal range and the control unit 1010' determines that the power stored in the power storage unit 13' reaches the predetermined value, the control unit 1010' makes the modulation unit 1041' generate a PWM signal PWM' including a cut-off supply signal, so as to make the powering end stop charging the bidirectional wireless charging device 1'.

In addition, the above embodiment is an example for describing the application of the instant disclosure, but it is not limited herein. The user can set the normal range of power provided by the power storage unit 13' and set the predetermined value of power stored in the power storage unit 13' based on need.

In other embodiments, the control unit 1010' is also configured to make the modulation unit 1041' generate a PWM signal PWM including a status message once every time interval, so as to inform the powering end of the current electric quantity of the bidirectional wireless charging device 1', an energy adjusting request, or an energy maintaining request. Thereby, the powering end can dynamically adjust the electromagnetic energy provided to the bidirectional wireless charging device 1'.

For instance, when the status message output by the bidirectional wireless charging device 1' indicates that the currently stored power of the bidirectional wireless charging device 1' is less than 70% of the maximum stored power, the powering end would output a PWM signal PWM with more energy. When the status message output by the bidirectional wireless charging device 1' indicates that the currently stored power of the bidirectional wireless charging device 1' is about 70%-90% of the maximum stored power, the powering end would output a PWM signal PWM with less energy. When the status message output by the bidirectional wireless charging device 1' indicates that the currently stored power of the bidirectional wireless charging device 1' is more than 90% of the maximum stored power, the powering end would stop charging the bidirectional wireless charging device 1'. In addition, the above embodiment is an example for describing the application of the instant disclosure, but it is not limited herein. The user can set how the bidirectional wireless charging device 1 and bidirectional wireless charging device 1' dynamically adjust the electromagnetic energy based on needs.

In this embodiment, the transceiver chip 10 of the bidirectional wireless charging device 1 merely comprises one power mode operation module 103 and one charging mode operation module 104. In other embodiments, the transceiver chip 10 can also comprise a plurality of coils 11, a plurality of power mode operation modules 103 and a plurality of charging mode operation modules 104. The power mode operation modules 103 are electrically connected to the control module 101 and the corresponding coil 11 respectively, and the charging mode operation modules 104 are electrically connected to the control module 101, the corresponding coils and the power stage circuit 102 respectively. Thereby, the bidirectional wireless charging device 1 can receive the electromagnetic energy from many powering ends at the same time or can provide the electromagnetic energy to many charging ends at the same time, which makes the bidirectional wireless charging device 1 have multiple bidirectional wireless charging functions.

It is worth mentioning that, in the above embodiment, the user needs to manually operate the bidirectional wireless charging device 1 to generate a switch signal and start the charging process. However, in other embodiments, the two bidirectional wireless charging devices 1 and 1' in the bidirectional wireless charging system can automatically start the charging process.

In detail, in other embodiments, the user can set the bidirectional wireless charging devices 1 and 1' to turn on the automatic charging function. When the distance between the bidirectional wireless charging devices 1 and 1' is less than a preset distance, the bidirectional wireless charging devices 1 and 1' would exchange their status messages to inform each other of the current electric quantity. When the current electric quantity of the bidirectional wireless charging device 1 is more than a first threshold value and the current electric quantity of the bidirectional wireless charging device 1' is less than a second threshold value, the bidirectional wireless charging device 1 would start to charge the bidirectional wireless charging device 1'.

For example, when the current electric quantity of the bidirectional wireless charging device 1' is less than 20% of the maximum stored power and the current electric quantity of the bidirectional wireless charging device 1 is more than 80% of the maximum stored power, the bidirectional wireless charging device 1 would automatically charge the bidirectional wireless charging device V. In addition, the above embodiment is merely an example for describing the application of the instant disclosure, but it is not limited herein. The skilled in the art can set the predetermined distance, a first threshold value and second threshold value based on the actual operation and needs. Moreover, the user can also choose to turn off the automatic charging function of the bidirectional wireless charging devices 1 and 1', and thus in the instant disclosure the bidirectional wireless charging devices 1 and 1' can optionally turn on their automatic charging function.

On the other hand, in other embodiments, the bidirectional wireless charging system can be set such that the bidirectional wireless charging device 1 periodically sends a switch signal to another bidirectional wireless charging device. When the bidirectional wireless charging device 1' receives the switch signal and the bidirectional wireless charging device 1' has insufficient power, the bidirectional wireless charging device 1' would reply to this switch signal. After receiving the reply of the bidirectional wireless charging device 1', the bidirectional wireless charging device 1 would turn into the power mode and start to charge the bidirectional wireless charging device 1'.

In short, the bidirectional wireless charging device provided in the embodiment of the instant disclosure can be used as a powering end or a charging end, so as to increase the convenience of the bidirectional wireless charging system. Moreover, the transceiver chip 10 of the bidirectional wireless charging device provided in the embodiment of the instant disclosure integrates the power mode operation module 103 and the charging mode operation module 104 into a single chip. Thereby, the bidirectional wireless charging device 1 merely needs one control module 101 and one power stage circuit 102 to realize the bidirectional wireless charging function.

Figure 6:
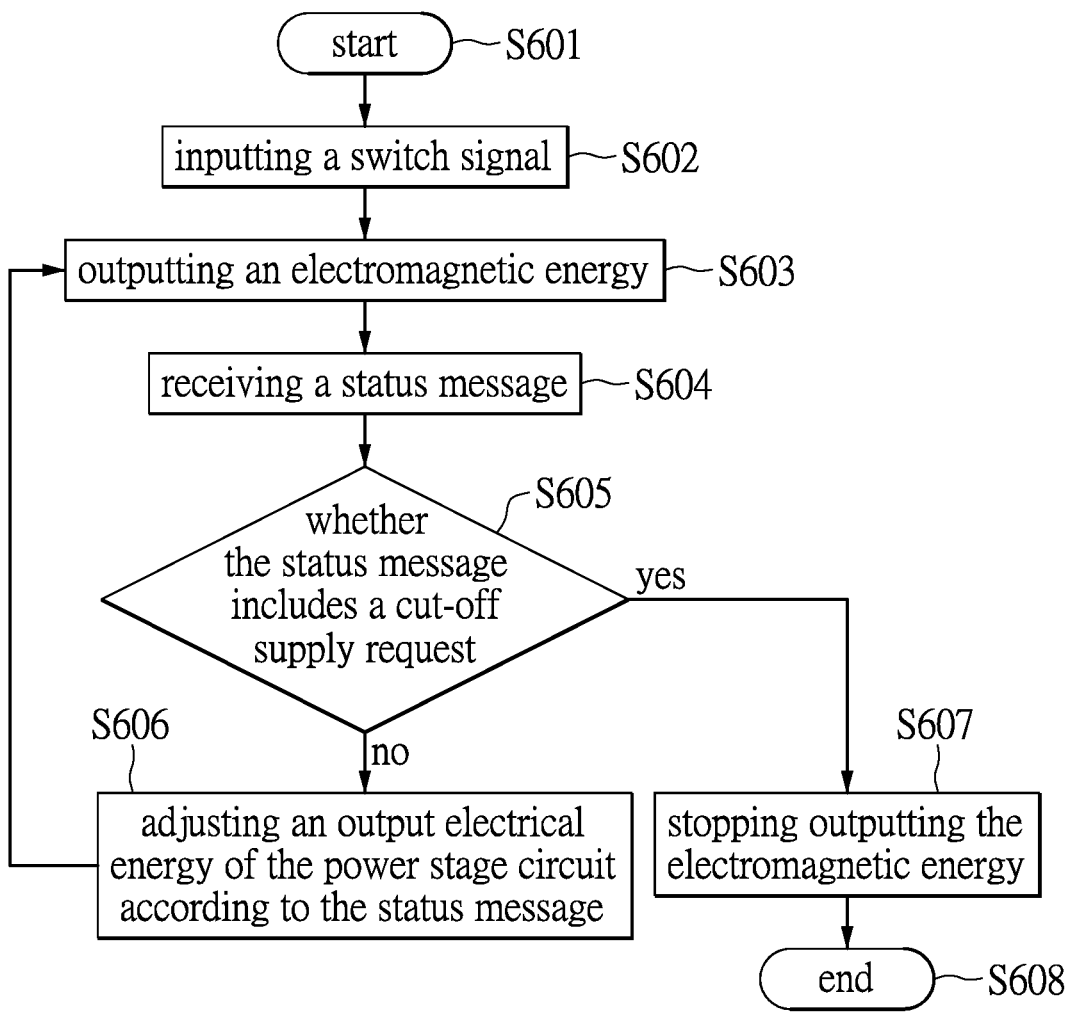
FIG. 6 shows a flow chart of a bidirectional wireless charging device of one embodiment of the instant disclosure in the power mode.

Please refer to FIG. 6, FIG. 6 shows a flow chart of a bidirectional wireless charging device of one embodiment of the instant disclosure in the power mode. The steps of process shown in FIG. 6 are applied to the above bidirectional wireless charging devices 1 and 1'. The Step S601 is starting the powering process. The Step S602 is making the bidirectional wireless charging device 1 turn into the power mode. The switch signal can be sent from the switch signal generating unit of the bidirectional wireless charging device 1 or from the switch signal generating unit of another bidirectional wireless charging device (such as the bidirectional wireless charging device 1'). The Step S603 is that the bidirectional wireless charging device 1 starts to output the electromagnetic energy to the bidirectional wireless charging device 1'.

The Step S604 is that the bidirectional wireless charging device 1 receives and demodulates a PWM signal PWM' sent by the bidirectional wireless charging device 1', so as to obtain a status message of the bidirectional wireless charging device 1', which includes an electric quantity in formation of the charging end, an energy adjusting request, an energy maintaining request or a cut-off supply request. The Step S605 is that the bidirectional wireless charging device 1 determines whether the status message includes a cut-off supply message. If the status message includes a cut-off supply message, it goes to the Step S606, and if the status message does not include a cut-off supply message, it goes to the Step S607. The Step S606 is that the bidirectional wireless charging device 1 adjusts the power output by the power stage circuit according to the status message and that it returns to the Step S603 so as to continue to charge the bidirectional wireless charging device V. The steps for the bidirectional wireless charging device 1 adjusting the power output by the power stage circuit are the same as the above embodiment, and thus the redundant information is not repeated. The Step S606 is that the bidirectional wireless charging device 1 stops outputting the electromagnetic energy, and the Step S607 is ending the powering process.

Figure 7:
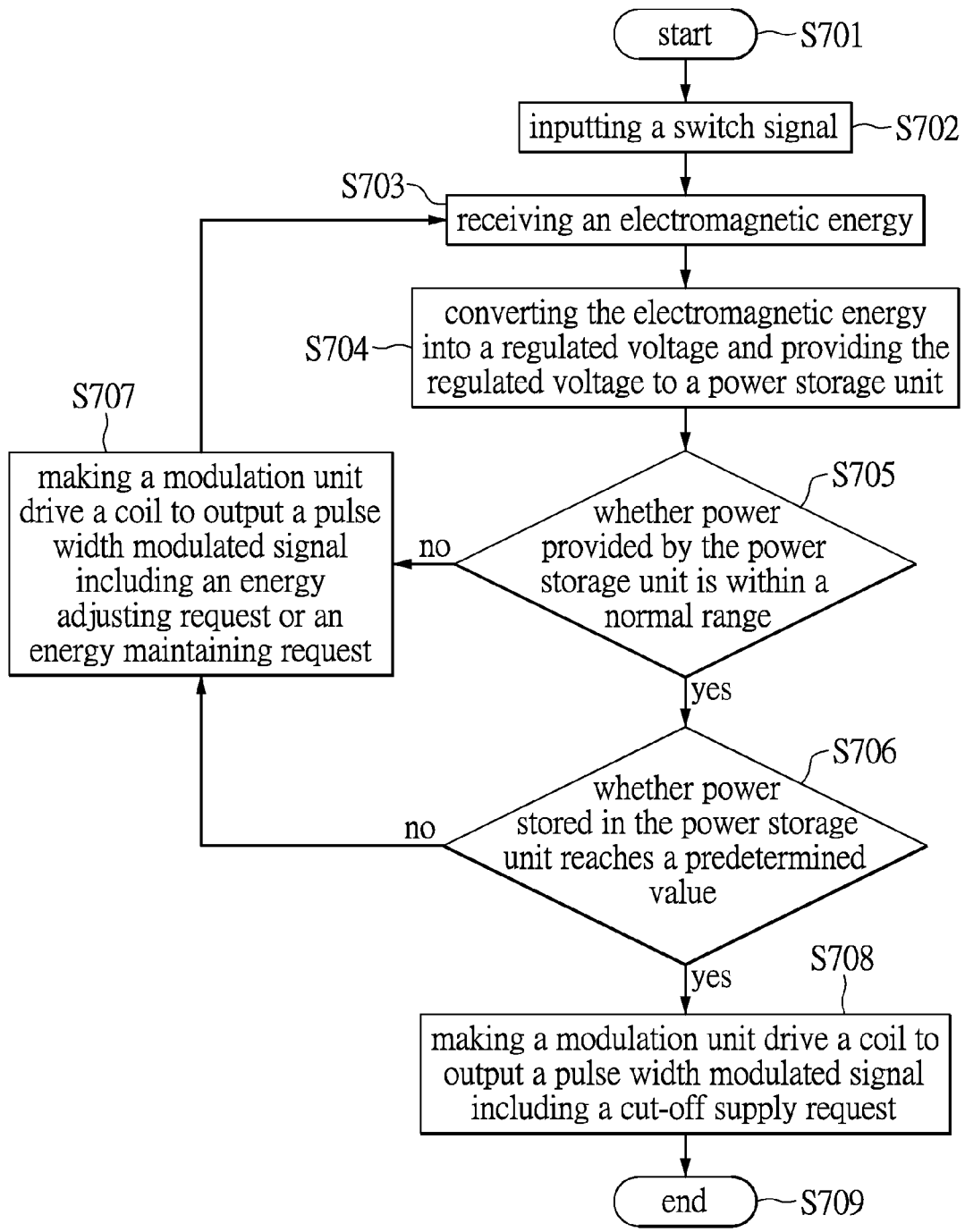
FIG. 7 shows a flow chart of a bidirectional wireless charging device of one embodiment of the instant disclosure in the charging mode.

Please refer to FIG. 7, FIG. 7 shows a flow chart of a bidirectional wireless charging device of one embodiment of the instant disclosure in the charging mode. The steps of the process shown in FIG. 7 are also applied to the above bidirectional wireless charging devices 1 and 1'. The Step S701 is starting the charging process. The Step S702 is that the bidirectional wireless charging device 1' receives a switch signal and turns into the charging mode. The Step S703 is that the bidirectional wireless charging device 1' receives a PWM signal PWM from another bidirectional wireless charging device (such as the bidirectional wireless charging device 1), so as to charge based on the electromagnetic energy of the PWM signal PWM. The Step S704 is that the bidirectional wireless charging device 1' converts the electromagnetic energy into a regulated voltage and provides the regulated voltage to the power storage unit 13' for charging.

The Step S705 is that control unit 1010' of the bidirectional wireless charging device 1' determines whether the power provided from the power storage unit 13' to the bidirectional wireless charging device 1' is within a normal range. As described above, those skilled in the art can set this normal range of power provided by the power storage unit 13' based on need. If the power provided by the power storage unit 13' is within the normal range, it goes to the Step S706. If the power provided by the power storage unit 13' is not within the normal range, it goes to the Step S707.

The Step S706 is that the control unit 1010' determines whether the power stored in the power storage unit 13' reaches a predetermined value. If the control unit 1010' determines that the power stored in the power storage unit 13' reaches the predetermined value, it goes to the Step S708, otherwise it goes to the Step S707. As described above, those skilled in the art can set a predetermined value of power stored in the power storage unit 13' based on need. The Step S707 is that the control unit 1010' makes the modulation unit 1041' drive the coil 11' to generate a PWM signal PWM' including an energy adjusting request or an energy maintaining request, so as to inform the bidirectional wireless charging device 1 of its electric quantity information. After the bidirectional wireless charging device 1 receives the PWM signal PWM', it adjusts the output power according to the status message of the PWM signal PWM' and continues to provide the electromagnetic energy to the bidirectional wireless charging device 1'.

The Step S708 is that the power stored in the power storage unit 13' reaches the predetermined value, so the control unit 1010' makes the modulation unit 1041' drive the coil 11' to generate a PWM signal PWM' including a cut-off supply request. After that, the bidirectional wireless charging device 1' outputs the PWM signal PWM' to the bidirectional wireless charging device 1, so that that bidirectional wireless charging device 1 stops charging the bidirectional wireless charging device 1'. The Step S709 is ending the charging process.

To sum up, the bidirectional wireless charging device provided by the instant disclosure can be used as a powering end or a charging end to improve the convenience of the bidirectional wireless charging device. Moreover, compared with the traditional bidirectional wireless charging device, the transceiver chip of the bidirectional wireless charging device provided by the instant disclosure integrates the power mode operation module and the charging mode operation module into a single chip. Thereby, merely one control module and one power stage circuit are needed for the instant disclosure to provide the bidirectional wireless charging function, which effectively shrinks the circuit area, decreases the cost and also reduces the system complexity.

In addition, in the transceiver chip provided by the embodiment of the instant disclosure, the power mode operation module and the charging mode operation module are set to use one control module and one power stage circuit together, and the number of pins of the transceiver chip also decreases. In detail, in the power mode, part of the pins of the transceiver chip can be necessarily used for powering. When switching to the charging mode, the above part of the pins would be necessarily used with the change of the transceiver chip's mode. In other words, part of the pins of the transceiver chip is used both in the power mode and the charging mode. Thereby, the number of pins of the transceiver chip can be decreased, which effectively reduces the cost of the transceiver chip.

Moreover, the traditional bidirectional wireless charging device using the electromagnetic induction technology would lose some power after electromagnetic transduction because of the external circuit, which decreases the power obtained by the bidirectional wireless charging device. The bidirectional wireless charging device provided by the embodiment of the instant disclosure integrates the switching circuit, the rectifying circuit and the demodulation circuit into a single transceiver chip, which reduces the power loss and thus increases the efficiency of the bidirectional wireless charging device.

The bidirectional wireless charging device provided by the embodiment of the instant disclosure also provides an automatic charging function. When there is not sufficient power, the bidirectional wireless charging device would automatically search for a nearby bidirectional wireless charging device for charging, so that the user need not manually operate the bidirectional wireless charging device for charging.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A bidirectional wireless charging device, comprising:
    a transceiver chip, receiving a switch signal, the transceiver chip comprising:
        a power stage circuit, electrically connected to a coil, outputting a voltage to the coil or receiving an induced voltage from the coil;
        a control module, electrically connected to the power stage circuit, correspondingly making the transceiver chip turn into a power mode or a charging mode according to the switch signal;
    at least one power mode operation module, electrically connected to the coil and the control module; and
    at least one charging mode operation module, electrically connected to the coil, the power stage circuit and the control module;
    wherein when the switch signal indicates that the transceiver chip turns into the power mode, the control module connects the circuit path to the power mode operation module while disconnects the circuit path to the charging mode operation module and the transceiver chip provides the voltage to the coil;
    wherein when the switch signal indicates that the transceiver chip turns into the charging mode, the control module connects the circuit path to the charging mode operation module while disconnects the circuit path to the power mode operation module and the transceiver chip receives the induced voltage from the coil and charges a power storage unit of the bidirectional wireless charging device.

2. The bidirectional wireless charging device according to claim 1, wherein the control module further comprises a switching unit correspondingly controlling the transceiver chip according to the switch signal.

3. The bidirectional wireless charging device according to claim 2, wherein the switching unit is a multiplexer or a MOSFET switch.

4. The bidirectional wireless charging device according to claim 1,
    wherein when the transceiver chip turns into the power mode, a control unit of the control module makes the power stage circuit output the voltage to the coil, and the coil converts the received voltage into a pulse width modulated signal and sends out the pulse width modulated signal; and
    wherein the pulse width modulated signal includes an electromagnetic energy.

5. The bidirectional wireless charging device according to claim 4, wherein the power mode operation module comprises:
    a demodulation unit, electrically connected to the coil and the control unit, configured to receive the pulse width modulated signal via the coil and to demodulate the pulse width modulated signal so as to obtain a status message, the status message comprising a current electric quantity of a charging end, an energy adjusting request, an energy maintaining request or a cut-off supply request;
    wherein the demodulation unit demodulates the pulse width modulated signal to output the status message, and the control unit receives the status message and correspondingly controls the voltage output by the power stage circuit according to the status message.

6. The bidirectional wireless charging device according to claim 1, wherein when the transceiver chip turns into the charging mode, the coil receives a pulse width modulated signal and generates the induced voltage according to an electromagnetic energy of the pulse width modulated signal, the power stage circuit receives the induced voltage from the coil and generates a rectified voltage, and the power stage circuit outputs the power stage circuit to the charging mode operation module.

7. The bidirectional wireless charging device according to claim 6, wherein the charging mode operation module comprises:
a voltage regulating unit, electrically connected to the power stage circuit, the control module and a power processing unit, configured to regulate the rectified voltage and to generate a regulated voltage;
wherein the voltage regulating unit outputs the rectified voltage to the control module so as to provide an electrical energy for operating of the bidirectional wireless charging device, the voltage regulating unit outputs the regulated voltage to the power processing unit, and the power processing unit charges the power storage unit.

8. The bidirectional wireless charging device according to claim 7, wherein the charging mode operation module further comprises:
a modulation unit, electrically connected to the coil and a control unit of the control module, and controlled by the control unit to change an amplitude of voltage of the coil so as to generate a status of the pulse width modulated signal, wherein the status message comprises a current electric quantity of a charging end, an energy adjusting request, an energy maintaining request or a cut-off supply request;
wherein the control unit makes the modulation unit drive the coil to generate the pulse width modulated signal after the control unit receives the regulated voltage.

9. The bidirectional wireless charging device according to claim 1, wherein the transceiver chip comprises a plurality of coils, a plurality of power mode operation modules and a plurality of charging mode operation modules, each power mode operation is electrically connected to the control unit and one of the coils, and each charging mode operation module is electrically connected to the control unit, the power stage circuit and one of the coils, so as to provide the bidirectional wireless charging device with a multiple bidirectional wireless charging functions.

10. The bidirectional wireless charging device according to claim 1, wherein the bidirectional wireless charging device is a mobile phone, a tablet computer, a laptop, a wireless charger, a smart watch or a set top box.

11. A bidirectional wireless charging system, comprising:
a first bidirectional wireless charging device and a second bidirectional wireless charging device, the first bidirectional wireless charging device and the second bidirectional wireless charging device respectively comprises:
a transceiver chip, receiving a switch signal, the transceiver chip comprising:
a power stage circuit, electrically connected to a coil, outputting a voltage to the coil or receiving an induced voltage from the coil;
a control module, electrically connected to the power stage circuit, correspondingly making the transceiver chip turn into a power mode or a charging mode according to the switch signal;
at least one power mode operation module, electrically connected to the coil and the control module; and
at least one charging mode operation module, electrically connected to the coil, the power stage circuit and the control module;
wherein the first bidirectional wireless charging device and the second bidirectional wireless charging device are a charging end and a powering end according to the switch signal;
wherein when the first bidirectional wireless charging device is the powering end, the transceiver chip of the first bidirectional wireless charging device turns into the power mode, the control module connects the circuit path to the power mode operation module while disconnects the circuit path to the charging mode operation module, and the transceiver chip provides the voltage to the coil so as to make the first bidirectional wireless charging device provide a pulse width modulated signal to the second bidirectional wireless charging device, and the pulse width modulated signal includes an electromagnetic energy;
wherein when the second bidirectional wireless charging device is the charging end, the transceiver chip of the second bidirectional wireless charging device turns into the charging mode, the control module connects the circuit path to the charging mode operation module while disconnects the circuit path to the power mode operation module, the transceiver chip receives the induced voltage from the coil, and charges a power storage unit of the second bidirectional wireless charging device.

12. The bidirectional wireless charging system according to claim 11, wherein the first bidirectional wireless charging device and the second bidirectional wireless charging device respectively comprises a switching unit correspondingly controlling the transceiver chip according to the switch signal.

13. The bidirectional wireless charging system according to claim 12, wherein the switching is a multiplexer or a MOSFET switch.

14. The bidirectional wireless charging system according to claim 11,
wherein when the transceiver chip turns into the power mode a control unit of the control module makes the power stage circuit output the voltage to the coil, and the coil convers the received voltage into the pulse width modulated signal and sends out the pulse width modulated signal.

15. The bidirectional wireless charging system according to claim 14, wherein the power mode operation modules of the first bidirectional wireless charging device and the second bidirectional wireless charging device respectively comprise:
a demodulation unit, electrically connected to the coil and the control unit, configured to receive the pulse width modulated signal via the coil and to demodulate the pulse width modulated signal so as to obtain a status message, the status message comprising a currently stored electric quantity of a charging end, an energy adjusting request, an energy maintaining request or a cut-off supply request;
wherein the demodulation unit demodulates the pulse width modulated signal to output the status message, and the control unit receives the status message and correspondingly controls the voltage output by the power stage circuit according to the status message.

16. The bidirectional wireless charging system according to claim 11, wherein when the transceiver chip turns into the charging mode, the coil receives a pulse width modulated signal and generates the induced voltage according to the electromagnetic energy of the pulse width modulated signal, the power stage circuit receives the induced voltage from the coil and generates a rectified voltage, and the power stage circuit outputs the power stage circuit to the charging mode operation module.

17. The bidirectional wireless charging system according to claim 16, wherein the charging mode operation modules of the first bidirectional wireless charging device and the second bidirectional wireless charging device respectively comprise:
   a voltage regulating unit, electrically connected to the power stage circuit, the control module and a power processing unit, configured to regulate the rectified voltage and to generate a regulated voltage;
   wherein the voltage regulating unit outputs the rectified voltage to the control module so as to provide an electrical energy for operation of the control module, the voltage regulating unit outputs the regulated voltage to the power processing unit, and the power processing unit charges the power storage unit.

18. The bidirectional wireless charging system according to claim 17, wherein the charging mode operation modules of the first bidirectional wireless charging device and the second bidirectional wireless charging device respectively comprise:
   a modulation unit, electrically connected to the coil and a control unit of the control module, and controlled by the control unit to change an amplitude of voltage of the coil so as to generate a status of the pulse width modulated signal, wherein the status message comprises a currently stored electric quantity of the power storage unit, an energy adjusting request, an energy maintaining request or a cut-off supply request;
   wherein the control unit makes the modulation unit drive the coil to generate the pulse width modulated signal after the control unit receives the regulated voltage.

19. The bidirectional wireless charging system according to claim 11, wherein the first bidirectional wireless charging device and the second bidirectional wireless charging device are a mobile phone, a tablet computer, a laptop, a wireless charger, a smart watch or a set top box.

20. The bidirectional wireless charging system according to claim 11, wherein when a distance between the first bidirectional wireless charging device and the second bidirectional wireless charging device is smaller than a predetermined value, the first bidirectional wireless charging device and the second bidirectional wireless charging device exchange a status message with each other, wherein the status messages respectively comprise a currently stored electrical quantity of the first bidirectional wireless charging device and the second bidirectional wireless charging device.

21. The bidirectional wireless charging system according to claim 20, wherein when the currently stored electrical quantity of the first bidirectional wireless charging device is more than a first threshold value and when the currently stored electrical quantity of the second bidirectional wireless charging device is less than a second threshold value, the first bidirectional wireless charging device charges the second bidirectional wireless charging device.

22. The bidirectional wireless charging system according to claim 11, wherein the first bidirectional wireless charging device periodically sends the switch signal, the second bidirectional wireless charging device receives the switch signal and turns into the charging mode according to the switch signal, the second bidirectional wireless charging device replies the switch signal, and the first bidirectional wireless charging device turns into the power mode and starts to charge the second bidirectional wireless charging device after the first bidirectional wireless charging device receives a reply of the second bidirectional wireless charging device.

* * * * *